(12) United States Patent
O'Connor et al.

(10) Patent No.: US 9,736,319 B2
(45) Date of Patent: *Aug. 15, 2017

(54) MOBILE DEVICE PUSH NOTIFICATION USING MOBILE APPLICATION USAGE HISTORY

(71) Applicant: GOOGLE INC., Mountain View, CA (US)

(72) Inventors: Timothy Wong O'Connor, Moraga, CA (US); Luis German Benavides Oyaga, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,288

(22) Filed: Oct. 28, 2016

(65) Prior Publication Data

US 2017/0048396 A1 Feb. 16, 2017

Related U.S. Application Data

(63) Continuation of application No. 14/566,688, filed on Dec. 10, 2014, now Pat. No. 9,509,857.

(51) Int. Cl.

| H04M 15/00 | (2006.01) |
|---|---|
| G06Q 30/08 | (2012.01) |
| G06N 99/00 | (2010.01) |
| H04M 1/725 | (2006.01) |
| H04W 68/00 | (2009.01) |

(Continued)

(52) U.S. Cl.
CPC .......... *H04M 15/60* (2013.01); *G06N 99/005* (2013.01); *G06Q 30/08* (2013.01); *H04M 1/72525* (2013.01); *H04M 15/85* (2013.01); *H04W 68/005* (2013.01); *H04M 2215/32* (2013.01); *H04W 4/12* (2013.01); *H04W 80/12* (2013.01)

(58) Field of Classification Search
CPC ..... H04W 4/023; H04W 4/206; H04W 4/003; H04L 67/22; G06Q 30/0251; G06Q 30/0255; G06Q 30/0241
USPC ........ 455/405, 412.1, 412.2; 705/14.4–14.55
See application file for complete search history.

(56) References Cited

U.S. PATENT DOCUMENTS 8,571,999 B2    10/2013  Crawford
9,509,857 B2 *  11/2016  O'Connor ............. H04M 15/60
(Continued)

OTHER PUBLICATIONS

Williams, "U.S. Office Action issued in copending U.S. Appl. No. 14/566,688, filed Dec. 10, 2014", mailed on Apr. 13, 2016, 7 pages.

(Continued)

*Primary Examiner* — Kimberly A Williams
(74) *Attorney, Agent, or Firm* — Johnson, Marcou & Isaacs, LLC

(57) ABSTRACT

Mobile device application usage history is collected across a plurality of mobile device applications. A mobile device application usage trigger event is received. For each of a plurality of candidate push notifications, a quality score adjustment is determined as a function of the collected mobile device application usage history and the trigger event. An opportunity to push a notification to the first mobile device is auctioned based on the adjusted quality scores. The notification of the auction winner is pushed to the first mobile device.

18 Claims, 5 Drawing Sheets

(51) Int. Cl.
*H04W 4/12* (2009.01)
*H04W 80/12* (2009.01)

(56) References Cited

U.S. PATENT DOCUMENTS

| | | |
|---|---|---|
| 2011/0320307 A1 | 12/2011 | Mehta et al. |
| 2013/0185292 A1 | 7/2013 | Li et al. |
| 2014/0040017 A1 | 2/2014 | Bafna et al. |
| 2014/0156411 A1 | 6/2014 | Murgai |
| 2014/0172563 A1 | 6/2014 | Amit et al. |
| 2014/0207900 A1 | 7/2014 | Liu et al. |
| 2014/0362768 A1 | 12/2014 | Wood et al. |
| 2015/0088955 A1 | 3/2015 | Hendrick et al. |
| 2015/0142552 A1 | 5/2015 | Schmehl et al. |
| 2015/0149492 A1 | 5/2015 | Janakiraman et al. |
| 2015/0242645 A1 | 8/2015 | Burger et al. |
| 2016/0173700 A1 | 6/2016 | O'Connor et al. |

OTHER PUBLICATIONS

Williams, "U.S. Office Action issued in copending U.S. Appl. No. 14/566,688, filed Dec. 10, 2014", mailed on Sep. 22, 2015, 8 pages.

\* cited by examiner

200

```
┌─────────────────────────────────┐      ┌─────────────────────────────────┐
│ Collecting mobile device        │      │ Receive a mobile device         │
│ application usage sequence      │      │ application usage trigger event │
│ history across a plurality of   │      │              220                │
│ mobile device applications      │      │                                 │
│              210                │      │                                 │
└─────────────────────────────────┘      └─────────────────────────────────┘
```

For each of a plurality of candidate push notifications, determining a quality score adjustment as a function of the collected mobile device application usage sequence history and the trigger event
240

Auction, among the plurality of candidate push notifications, an opportunity to push a notification to the first mobile device based on the adjusted quality scores
250

Push the notification of the auction winner to the first mobile device.
260

FIG. 2

MOBILE DEVICE PUSH NOTIFICATION USING MOBILE APPLICATION USAGE HISTORY

CROSS REFERENCE TO RELATED APPLICATIONS

This patent application claims priority to and is a continuation of U.S. patent application No. 14/566,688, filed Dec. 10, 2014 and entitled "Mobile Device Push Notification Using Mobile Application Usage History." The entire contents of the above-identified priority application is hereby fully incorporated herein by reference.

TECHNICAL FIELD

The disclosed technology relates to mobile device notifications. Example embodiments relate to selection of mobile device notifications based on the mobile application usage history.

BACKGROUND

A "mobile application," or "mobile app," is a computer program designed to run on a mobile device such as a phone or a tablet computer. Mobile apps typically are distributed through platforms such as the GOOGLE PLAY® store. Typically, mobile apps can be downloaded from the platform to a target device, such as a mobile phone. Public demand for mobile applications, and the availability of developer tools, drove rapid expansion of the mobile app space over the past decade.

An ad "quality score" or "quality index" is a measure used by some online ad distributors, in part to increase the effectiveness of ads for the advertiser, increase the relevance of ads to the consumer, and (as a result) increase the ad distributor's revenue. To that end, a quality score can take into account, for example, the predicted click-through rate (CTR) of an ad, the relevance of the ad itself to the consumer's context, the relevance of the ad's landing page, the load time of the ad's landing page, and the nature of the targeted device.

A "push notification," also called a "server push notification," is the delivery of information from a software application to a computing device without a specific request from the client. Unlike pull notifications, in which the client must request information from a server, push notifications originate from a server. One aspect of push notifications in mobile device computing is that the technology does not require an application on a mobile device to be open in order for a message to be received. This allows the mobile device to receive and display notifications for mobile applications such as social media or text messaging even when the device's screen is locked and the application that is pushing the notification (for example, from a server of the application) is closed.

SUMMARY

The technology described herein includes computer-implemented methods, computer program products, and systems for mobile device push notification. In some embodiments mobile device application usage history is collected across a plurality of mobile device applications. A mobile device application usage trigger event is received from a first mobile device. For each of a plurality of candidate push notifications a quality score adjustment is determined as a function of the collected mobile device application usage history and the trigger event. An opportunity to push a notification to the first mobile device is auctioned among the plurality of candidate push notifications based on the adjusted quality scores. The notification of the auction winner is pushed to the first mobile device.

In some embodiments, collecting mobile device application usage history includes collecting the usage history of the first mobile device across applications installed on the first mobile device. In such embodiments, a candidate push notification of an application having usage sooner in the usage history after a trigger event receives a more favorable quality score adjustment than a candidate push notification of an application having usage later in the usage history after a trigger event.

Some embodiments include training a machine learning algorithm on the collected mobile device application usage history of the first mobile device across a plurality of applications installed on the first mobile device. In such embodiments, determining a quality score adjustment includes using the trained machine learning algorithm to determining a quality score adjustment. In some embodiments, the notification of the auction winner comprises a link to the installed application.

In some embodiments, collecting mobile device application usage history includes collecting the usage history of mobile devices, other than the first mobile device. In such embodiments, a candidate push notification of an application having usage sooner in the usage history after a trigger event receives a more favorable quality score adjustment than a candidate push notification of an application having usage later in the usage history after a trigger event.

Some embodiments include training a machine learning algorithm on the collected mobile device application usage history of mobile devices other than the first mobile device. In such embodiments, determining a quality score adjustment as a function of the collected mobile device application usage history and the trigger event includes using the trained machine learning algorithm to determining a quality score adjustment. In some such embodiments, the notification of the auction winner comprises a link to install the application on the first mobile device.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 2 is a block flow diagram depicting example methods for mobile device push notification, in accordance with certain example embodiments of the disclosed technology.

DETAILED DESCRIPTION OF THE EXAMPLE EMBODIMENTS

Overview

Figure 1:
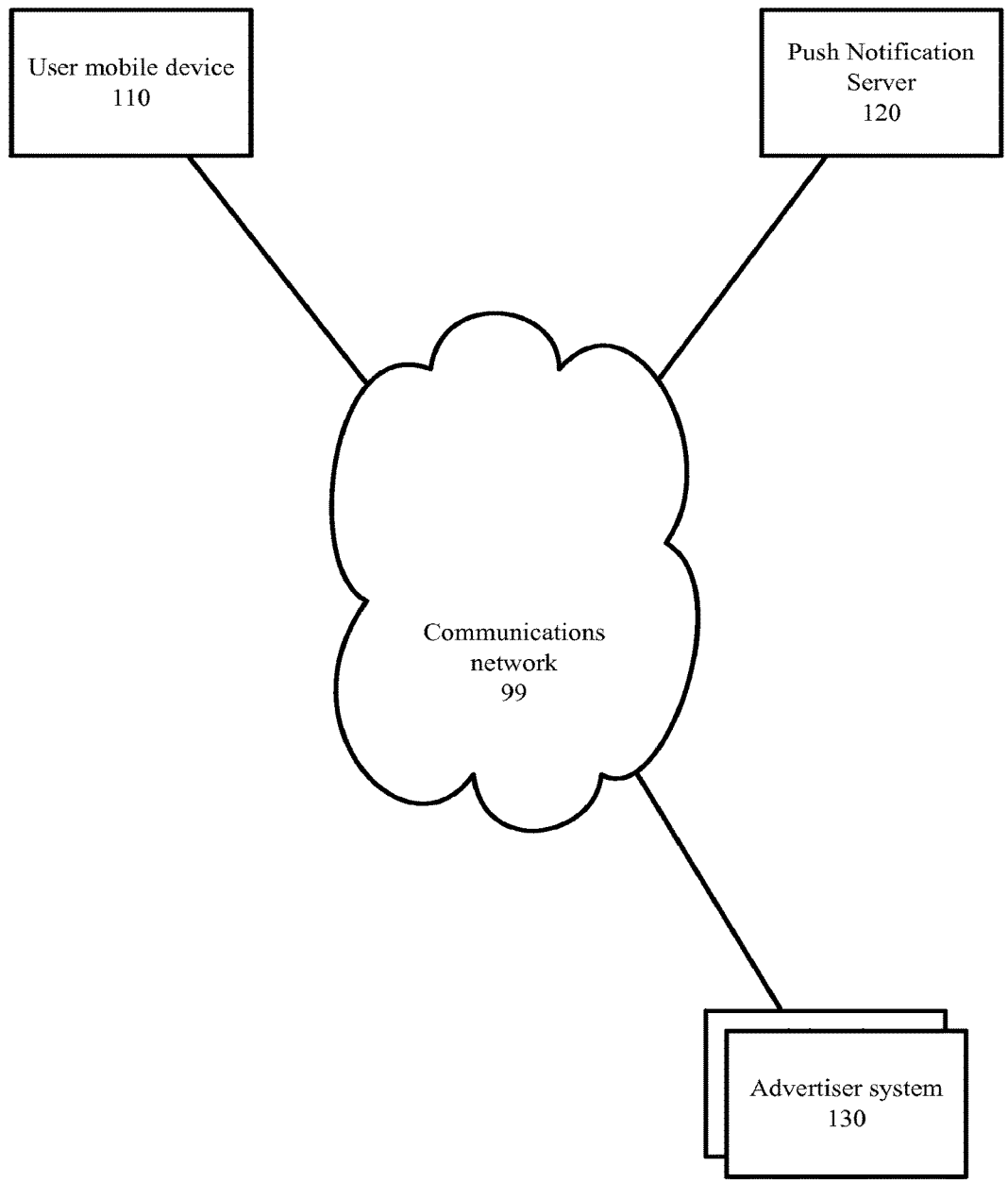
FIG. 1 is a block diagram depicting a communications and processing architecture for mobile device push notification, in accordance with certain example embodiments.

While quality scores based on predicted CTR can be effective in selecting an ad to display in response to a search engine query, or as a display ad on a web page, such quality scores may be less effective in a mobile app environment.

For example, in a mobile app environment, a user cannot navigate to another mobile app without first installing the other mobile app.

Embodiments of the present technology can assess usage patterns of mobile apps as they relate to usage patterns of other mobile apps over time. A quality score can be adjusted for each mobile app in light of other mobile apps for each individual user or group of users. More particularly, embodiments of the present technology can determine which of several push notifications to send to a mobile device after a trigger event is received, based at least in part on an auction in which bids are modified by a quality score that is adjusted based on mobile app usage history (either one, or both, of the history of the mobile device user and the history of a group of users) and the trigger event.

For example, consider, as a trigger event, a user using an app installed on her mobile device to check her online banking balance. In the collected history of that user's mobile application usage, that trigger event is most often followed by the user using a peer-to-peer (P2P) mobile payment app to transfer money to her son as the next mobile app usage, and then using a mobile messaging app to send an Short Messaging Service (SMS) message shortly thereafter. Embodiments of the present technology, present a push notification opportunity to various advertisers upon the trigger event. A candidate push notification regarding a P2P money transfer app will have a more favorable quality factor applied to its bid than a candidate push notification regarding a messaging app, since the user has a history of using a P2P app before using a messaging app after checking her account balance using an online banking app. The bid of a an advertiser offering a push notification unrelated to the user's history after such a trigger event would not benefit from an adjusted quality score.

The winning notification can include a link to an app installed on the user's mobile device, or a link for installing a new app on the user's mobile device. In the example above, the winning notification can include a link to a new P2P payment application that the user can install on her mobile phone.

While the example above describes pushing a single notification related to the trigger event, some embodiments of the technology can select and push multiple notifications. Continuing the example above, though a quality score adjustment to the bid for the messaging push notification was not sufficient for it to be the highest bid (over the bid for the P2P push notification), some embodiments can push the notification of the second highest bid after pushing the notification of the highest bid.

In some embodiments, a machine learning algorithm can be trained on the mobile device application usage history, and the trained machine learning algorithm can determine the quality score adjustment.

Turning now to the drawings, in which like numerals represent like (but not necessarily identical) elements throughout the figures, example embodiments of the present technology are described in detail.

Example System Architectures

FIG. 1 is a block diagram depicting a communications and processing architecture 100 for mobile device push notification, in accordance with certain example embodiments. While some servers, systems, and devices shown in the architecture are represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes network devices 110, 120, and 130; each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, and 130 can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a user may operate user mobile device 110; an advertiser may operate advertiser system 130, and an advertisement distributer may operate push notification server 120.

Figure 5:
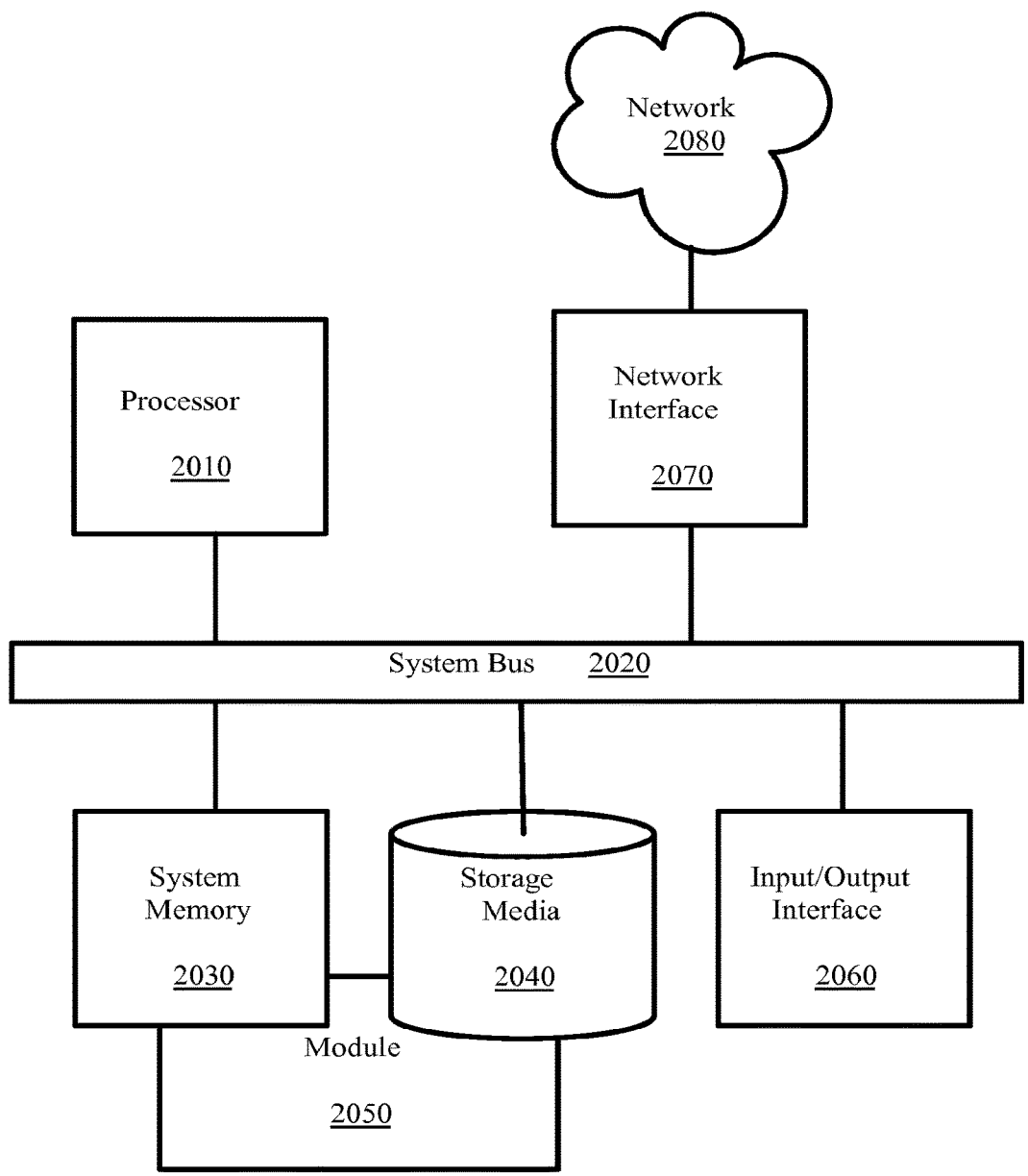
FIG. 5 is a diagram depicting a computing machine and a module, in accordance with certain example embodiments of the disclosed technology.

In example embodiments, the network devices, and any other computing machines associated with the technology presented herein, may be any type of computing machine such as, but not limited to, those discussed in more detail with respect to FIG. 5. Furthermore, any modules associated with any of these computing machines, such as modules described herein or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks, such as communications network 99. The communications network 99 may include any type of data or communications network, including any of the network technology discussed with respect to FIG. 5.

The network connections illustrated are example and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, consumer device computing device 110 may be embodied as a mobile phone or handheld computer may not include all the components described above.

Example Processes

The example methods illustrated in the following figures are described hereinafter with respect to the components of the example operating environment and example architecture described elsewhere herein. The example methods may also be performed with other systems and in other environments.

Referring to FIG. 2, and continuing to refer to prior figures for context, a block flow diagram depicting mobile device push notification 200, in accordance with certain example embodiments of the disclosed technology is shown. In such methods, mobile device application usage history is collected across a plurality of mobile device applications—Block 210.

Figure 3:
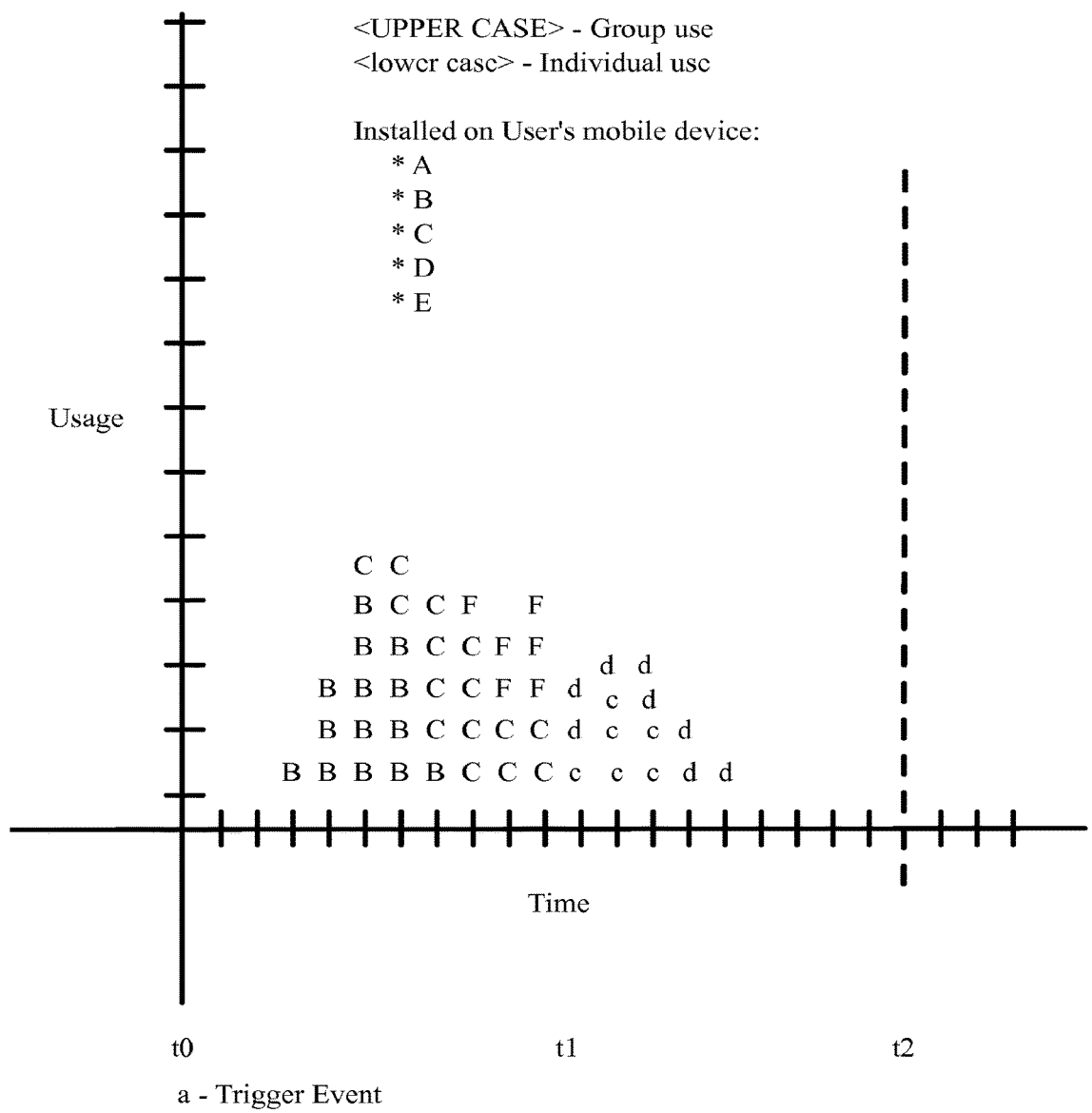
FIG. 3 is a notional usage history, in accordance with certain example embodiments of the disclosed technology.

FIG. 3 shows a notional usage history 300 that will be used herein in conjunction with a continuing example. In the usage history 300 of FIG. 3, after a trigger event "a" at time "t0" (in this example, the mobile device user booking an airline flight in a travel mobile app), group usage patterns indicate usage of mobile apps "B" (for a taxi service) and "C" (for public light rail or bus information) between "t0" and "t1," and use by the user of mobile apps "c" and "d" between "t1" and "t2." In this example, for reasons such a throttling and user experience considerations (for example, the user should see a limited number of push notifications per day), push notification server 120 determines to serve a push notification to the user's mobile device at time "t2." User's mobile device includes installed mobile apps "B," "C," "D" (for restaurant reservations), and "E" (for entertainment tickets). Note that usage of mobile app "E" does not appear in the usage history corresponding to trigger event "a," though it may appear in the usage history of mobile app "B," "C," or "D." In some embodiments, a usage history can include richer information, for example, details characterizing the nature of the mobile app usage.

A mobile app usage trigger event can be received from a first mobile device—Block 220. As noted above, in the continuing example, the trigger event "a" is the user booking a flight on a travel mobile app "A." As with usage history, in some embodiments, a trigger event can be characterized by richer information than mere usage. In some embodiments of the technology disclosed herein, trigger event "a" can be characterized by booking information such destination, expected time of arrival at the destination, number of expected bags, etc.

For each of a plurality of candidate push notifications, a quality score adjustment can be determined as a function of the collected mobile device application usage history and the trigger event—Block 250. In the continuing example, bids for candidate push notifications are received for mobile apps "A," "B," "C," "D," "E," and "F," as shown in TABLE 1. Note that the initial "Q" value for a candidate push notification associated with a bid is determined separately; and that mobile app "F" (for tickets to games of a local professional sports team) is similar to mobile app "E" and is not installed on the user's mobile device.

TABLE 1

| Mobile App | Original Bid | Initial Q | Cumulative Adjusted Q | Adjusted Bid = original Bid * Adjusted Q |
| --- | --- | --- | --- | --- |
| A | 1 | 2 | | |
| B | 5 | 7 | | |
| C | 7 | 5 | | |

TABLE 1-continued

| Mobile App | Original Bid | Initial Q | Cumulative Adjusted Q | Adjusted Bid = original Bid * Adjusted Q |
| --- | --- | --- | --- | --- |
| D | 8 | 6 | | |
| E | 11 | 4 | | |
| F | 9 | 2 | | |

In the continuing example, the rules of TABLE 2 are used to adjust a quality score "Q." None of the rules prompt an adjustment of the quality score of the candidate push notification associated with either mobile app "A" or mobile app "E." Application of Rule 1 results in a +3 adjustment to the quality score of the candidate push notification associated with mobile app "C." Application of Rule 2 results in a +2 adjustment to the quality score of the candidate push notification associated with mobile app "D." Application of Rule 3 results in a +1 adjustment to the quality score of the candidate push notification associated with mobile app "B." Application of Rule 4 results in a +1 adjustment to the quality score of the candidate push notification associated with mobile app "F." Application of Rule 5 results in a +1 adjustment to the quality score of the candidate push notification associated with mobile app "B." Application of Rule 6 results in a −1 adjustment to the quality score of the candidate push notification associated with mobile app "F."

TABLE 2

| | RULE | Adjust Q |
| --- | --- | --- |
| 1. | Most group uses of a mobile app installed on the mobile device before t2 | +3 |
| 2. | Most individual uses of mobile app installed on the mobile device before t2 | +2 |
| 3 | First use of a mobile app installed on the mobile device before t2, or | +1 |
| 4. | Most group uses of a mobile not installed on the mobile device before t2, or | +1 |
| 5. | $2^{nd}$ most group uses of a mobile app installed on the mobile device before t2 | +1 |
| 6. | Mobile app not installed on the mobile device, but similar mobile app installed on the mobile device | −1 |

TABLE 3 reflects each adjustment and the corresponding adjusted bid.

TABLE 3

| Mobile App | Original Bid | Initial Q | Cumulative Adjusted Q | Adjusted Bid = original Bid * Adjusted Q |
| --- | --- | --- | --- | --- |
| A | 1 | 2 | 0 | 2 |
| B | 5 | 7 | +2 | 45 |
| C | 7 | 5 | +3 | 56 |
| D | 8 | 6 | +2 | 64 |
| E | 11 | 4 | 0 | 44 |
| F | 9 | 2 | 0 | 18 |

The opportunity to push a notification to the first mobile device is auctioned based on the adjusted quality scores—Block 260. In the continuing example, the initial bid favors the candidate push notification of mobile app "E" (for event tickets), as does the initial bid*Q. However, after adjustment of Q based on the mobile app usage history and the trigger event, the candidate push notification associated with mobile app "D" (for restaurant reservations) wins the auction. The push notification of the auction-winning bid can be pushed to the first mobile device—Block 270. In the continuing example, the push notification corresponding to mobile app "D" (for restaurant reservations) is pushed to the user's mobile device.

The continuing example illustrates that mobile app usage history can be collected for both the first mobile device itself and for other mobile devices. In some embodiments of the disclosed technology, mobile app usage history can be collected for only one of a) the first mobile device, or b) for other mobile devices. The group of other mobile devices may be selected so that there is some common user characteristic shared by both the user of the first mobile device and members of the group, for example, common demographic characteristics.

The continuing example also illustrates that a candidate push notification of an application having usage sooner in the usage history after a trigger event can receive a more favorable quality score adjustment than a candidate push notification of an application having usage later in the usage history after a trigger event.

Figure 4:
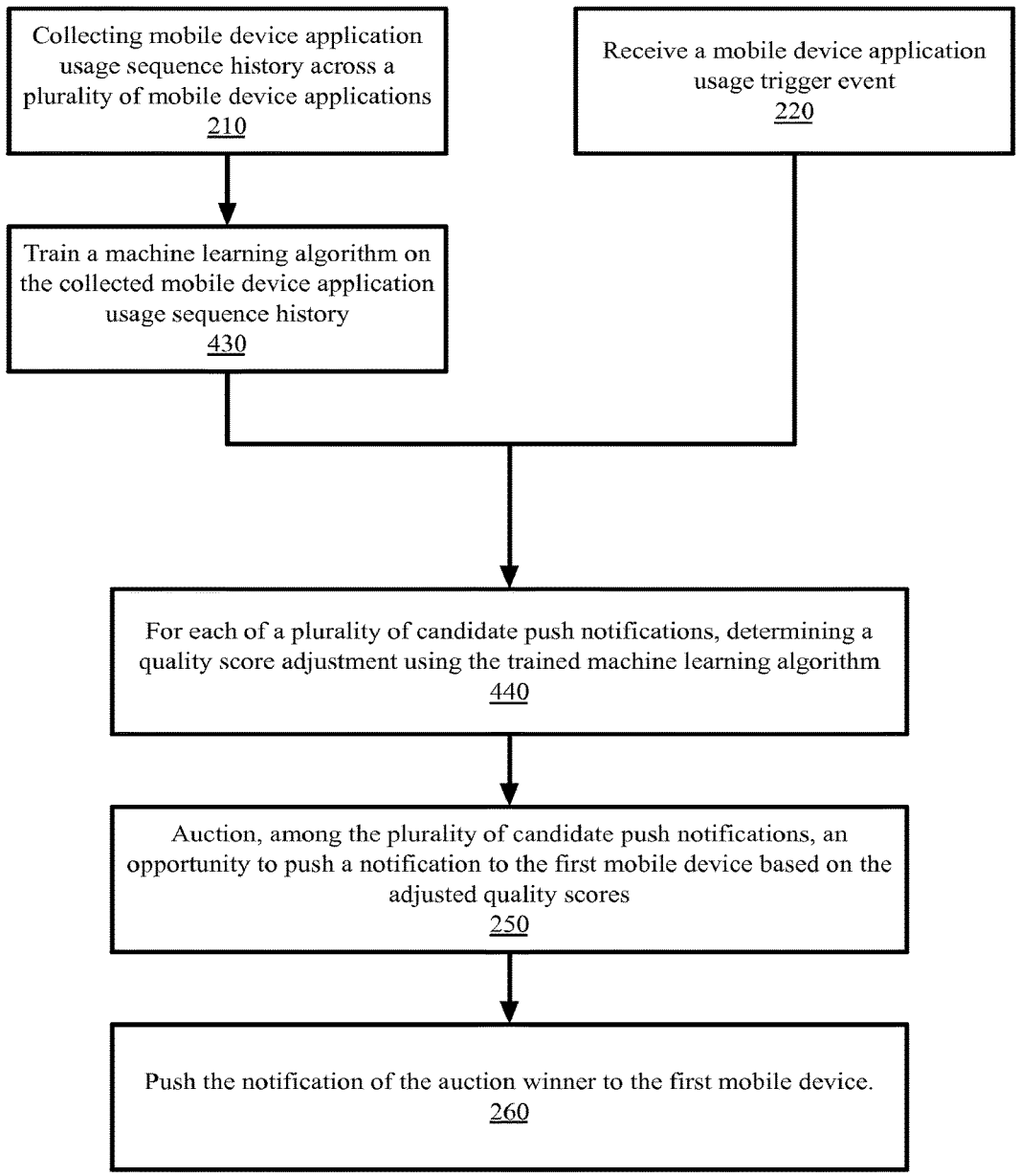
FIG. 4 is block flow diagram depicting example methods for mobile device push notification, in accordance with certain example embodiments of the disclosed technology.

Referring to FIG. 4, and continuing to refer to prior figures for context, a block flow diagram depicting mobile device push notification 400, in accordance with certain example embodiments of the disclosed technology is shown. In such methods Block 210, 220, 250, and 260 can be performed as described above in conjunction with FIG. 2. In such methods, a machine learning algorithm can be trained on the collected mobile device application usage history—Block 430. For example, a supervised machine learning method such as the Support Vector Machine (SVM) method can be used to analyze the mobile app usage history data and recognize patterns. Other machine learning techniques, such as naïve Bayes, neural networks, and decision trees can be used to train a model that will the quality score for each push notification bid. The adjusted quality score for each of a plurality of candidate push notifications can be determined using the trained model—Block 440.

In some embodiments, machine learning is used to associate the chronological application usage signals with outcome. For example, given specific sequence of mobile app usage and a resulting push notification, did a user open the notification and perform the action the advertiser was looking for? Then by combing over historical positive and negative examples, the machine learning system can learn which mobile app usage signals (including sequences of signals over time) are predictive of a higher quality and adjust accordingly. Such an adjustment can be an ongoing approach that runs periodically (for example nightly or weekly).

In some embodiments of the present technology, the push notification can contain a link to a mobile app already installed on the user's mobile device. In some embodiments, the push notification can contain a link that, when selected, will install mobile app on the user's mobile device.

Consider, as another example, a mobile device including installed apps for 1) discovering movie locations and playing times, viewing movie trailers, and meeting others with similar tastes in movies, 2) a mapping service app, such as GOOGLE MAPS™ mapping service, and a mobile shopping app such as the GOOGLE SHOPPER mobile shopping app. An SVM machine learning algorithm at a back end server can, with the user's opt in consent, collect data on mobile app usage over time. Such data can show that while the user launches the movie app frequently, the user typically buys tickets through the movie app more frequently when the user launches the mapping service app next soon thereafter. Trained in such a fashion by the SVM machine learning algorithm, an embodiment of the present technology would not adjust the quality score of a notification offered by the mobile shopping app if the user launched the movie app without launching the mapping service app next soon thereafter.

However, if the user launched the mapping service app next soon after launching the movie app, the quality score of the mobile shopping app push notification bid would be adjusted upward—making it more likely that the mobile shopping app push notification (in this case for movie-related paraphernalia) would win an auction for the push notification opportunity.

Other Example Embodiments

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid sate drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more s of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A computer-implemented method to notify mobile devices via push notification, comprising:
   receiving, by the one or more computing devices from a first mobile device, a mobile device application usage trigger event;
   for each of a plurality of candidate push notifications, determining by the one or more computing devices, a quality score adjustment as a function of collected mobile device application usage history and the trigger event wherein a candidate push notification of an application having usage sooner in the usage history after a trigger event receives a more favorable quality score adjustment than a candidate push notification of an application having usage later in the usage history after a trigger event;
   auctioning, by the one or more computing devices, among the plurality of candidate push notifications, an opportunity to push a notification to the first mobile device based on the adjusted quality scores; and
   pushing, by the one or more computing devices, the notification of the auction winner to the first mobile device.

2. The method of claim 1:
   further comprising training, by the one or more computing devices, a machine learning algorithm on the collected mobile device application usage history of the first mobile device across a plurality of applications installed on the first mobile device; and
   wherein determining a quality score adjustment as a function of the collected mobile device application usage history and the trigger event comprises, using the trained machine learning algorithm to determining a quality score adjustment.

3. The method of claim 1, wherein the notification of the auction winner comprises a link to the installed application.

4. The method of claim 1:
   wherein the collected mobile device application usage history is for other than the first mobile device, across a plurality of applications; and
   wherein a candidate push notification of an application having usage sooner in the usage history after a trigger event receives a more favorable quality score adjustment than a candidate push notification of an application having usage later in the usage history after a trigger event.

5. The method of claim 4:
   further comprising training, by the one or more computing devices, a machine learning algorithm on the collected mobile device application usage history; and
   wherein determining a quality score adjustment as a function of the collected mobile device application usage history and the trigger event comprises, using the trained machine learning algorithm to determining a quality score adjustment.

6. The method of claim 4, wherein the notification of the auction winner comprises a link to install the application on the first mobile device.

7. A computer program product, comprising:
   a non-transitory computer-readable storage device having computer-executable program instructions embodied thereon that when executed by a computer cause the computer to push a mobile device notification, the computer-executable program instructions comprising:
   computer-executable program instructions to receive a mobile device application usage trigger event;

computer-executable program instructions to determine, for each of a plurality of candidate push notifications, a quality score adjustment as a function of collected mobile device application usage history and the trigger event, wherein a candidate push notification of an application having usage sooner in the usage history after a trigger event receives a more favorable quality score adjustment than a candidate push notification of an application having usage later in the usage history after a trigger event;

computer-executable program instructions to auction, among the plurality of candidate push notifications, an opportunity to push a notification to the first mobile device based on the adjusted quality scores; and computer-executable program instructions to push the notification of the auction winner to the first mobile device.

8. The computer program product of claim 7:
further comprising computer-executable program instructions to train a machine learning algorithm on the collected mobile device application usage history of the first mobile device across a plurality of applications installed on the first mobile device; and
wherein computer-executable program instructions to determine, for each of a plurality of candidate push notifications, a quality score adjustment as a function of the collected mobile device application usage history and the trigger event comprise, using the trained machine learning algorithm to determining a quality score adjustment.

9. The computer program product of claim 7, wherein the notification of the auction winner comprises a link to the installed application.

10. The computer program product of claim 7:
wherein the collected mobile device application usage history is for other than the first mobile device, across a plurality of applications; and
wherein a candidate push notification of an application having usage sooner in the usage history after a trigger event receives a more favorable quality score adjustment than a candidate push notification of an application having usage later in the usage history after a trigger event.

11. The computer program product of claim 10:
further comprising training a machine learning algorithm on the collected mobile device application usage history; and
wherein determining a quality score adjustment as a function of the collected mobile device application usage history and the trigger event comprises, using the trained machine learning algorithm to determining a quality score adjustment.

12. The computer program product of claim 10, wherein the notification of the auction winner comprises a link to install the application on the first mobile device.

13. A system to push a mobile device notification, comprising:

a storage device; and
a processor communicatively coupled to the storage device, wherein the processor executes application code instructions that are stored in the storage device to cause the system to:
receive a mobile device application usage trigger event;
determine, for each of a plurality of candidate push notifications, a quality score adjustment as a function of collected mobile device application usage history and the trigger event, wherein a candidate push notification of an application having usage sooner in the usage history after a trigger event receives a more favorable quality score adjustment than a candidate push notification of an application having usage later in the usage history after a trigger event;
auction, among the plurality of candidate push notifications, an opportunity to push a notification to the first mobile device based on the adjusted quality scores; and
push the notification of the auction winner to the first mobile device.

14. The system of claim 13:
wherein the processor further executes application code instructions that are stored in the storage device to cause the system to train a machine learning algorithm on the collected mobile device application usage history of the first mobile device across a plurality of applications installed on the first mobile device; and
wherein determining, for each of a plurality of candidate push notifications, a quality score adjustment as a function of the collected mobile device application usage history and the trigger event comprises, using the trained machine learning algorithm to determining a quality score adjustment.

15. The system of claim 13, wherein the notification of the auction winner comprises a link to the installed application.

16. The system of claim 13:
wherein the collected mobile device application usage history is for other than the first mobile device, across a plurality of applications; and
wherein a candidate push notification of an application having usage sooner in the usage history after a trigger event receives a more favorable quality score adjustment than a candidate push notification of an application having usage later in the usage history after a trigger event.

17. The system of claim 16:
wherein the processor further executes application code instructions that are stored in the storage device to cause the system to train a machine learning algorithm on the collected mobile device application usage history; and
wherein determining a quality score adjustment as a function of the collected mobile device application usage history and the trigger event comprises, using the trained machine learning algorithm to determining a quality score adjustment.

18. The system of claim 16, wherein the notification of the auction winner comprises a link to install the application on the first mobile device.

* * * * *